United States Patent
Yu et al.

(10) Patent No.: US 12,057,809 B2
(45) Date of Patent: Aug. 6, 2024

(54) METHOD FOR CONTROLLING OPERATION OF MLPE DEVICE, METHOD FOR CONTROLLING MLPE DEVICES, AND PHOTOVOLTAIC SYSTEM

(71) Applicant: SUNGROW POWER SUPPLY CO., LTD., Anhui (CN)

(72) Inventors: Yanfei Yu, Anhui (CN); Anying Jiang, Anhui (CN); Yu Yang, Anhui (CN); Xiaoxun Li, Anhui (CN)

(73) Assignee: SUNGROW POWER SUPPLY CO., LTD., Anhui (CN)

(*) Notice: Subject to any disclaimer, the term of this patent is extended or adjusted under 35 U.S.C. 154(b) by 43 days.

(21) Appl. No.: 17/109,257

(22) Filed: Dec. 2, 2020

(65) Prior Publication Data
US 2022/0038052 A1  Feb. 3, 2022

(30) Foreign Application Priority Data
Jul. 30, 2020  (CN) .......................... 202010749781.X

(51) Int. Cl.
 *H02S 50/00*  (2014.01)
 *H02S 40/32*  (2014.01)
 (Continued)

(52) U.S. Cl.
 CPC .............. *H02S 50/00* (2013.01); *H02S 40/32* (2014.12); *H02J 1/00* (2013.01); *H02J 1/10* (2013.01);
 (Continued)

(58) Field of Classification Search
 CPC ...... H02S 50/00; H02S 40/32; H02J 2300/24; H02J 2300/26; H02J 3/381; H02J 1/00;
 (Continued)

(56) References Cited

U.S. PATENT DOCUMENTS

2010/0327659 A1   12/2010  Lisi et al.
2012/0112760 A1    5/2012  Yoscovich et al.
(Continued)

FOREIGN PATENT DOCUMENTS

CN   106941263 A   7/2017
CN   107017665 A   8/2017
(Continued)

OTHER PUBLICATIONS

Partial European Search Report regarding Application No. 20207018.1 dated Mar. 10, 2021.
(Continued)

*Primary Examiner* — Michael Y Sun
(74) *Attorney, Agent, or Firm* — Harness, Dickey & Pierce, P.L.C.

(57) ABSTRACT

Provided are a method for controlling operation of a module level power electronics (MLPE) device, a method for controlling MLPE devices and a photovoltaic system. In the method for controlling operation of a MLPE device, if it is determined that a current of a photovoltaic string where the MLPE device is located is less than a current threshold and coding information sent by a converter in the photovoltaic system is not received for a first preset time period, an output voltage or an output power of the MLPE device is controlled to be less than a corresponding threshold.

7 Claims, 7 Drawing Sheets

(51) Int. Cl.
    *H02J 1/00*     (2006.01)
    *H02J 1/10*     (2006.01)
    *H02J 3/38*     (2006.01)
    *H02M 1/32*     (2007.01)
    *H02M 3/42*     (2006.01)
    *H02M 7/36*     (2006.01)
    *H02M 7/62*     (2006.01)
    *H02M 7/95*     (2006.01)

(52) U.S. Cl.
    CPC ........... *H02J 3/381* (2013.01); *H02J 2300/24* (2020.01); *H02M 1/32* (2013.01); *H02M 3/42* (2013.01); *H02M 7/36* (2013.01); *H02M 7/62* (2013.01); *H02M 7/95* (2013.01)

(58) Field of Classification Search
    CPC .. H02J 1/10; H02M 1/32; H02M 3/42; H02M 7/36; H02M 7/62; H02M 7/95
    See application file for complete search history.

(56) References Cited

U.S. PATENT DOCUMENTS

| 2012/0212066 | A1 | 8/2012 | Adest et al. |
| 2014/0306542 | A1 | 10/2014 | Williams |
| 2015/0013744 | A1 | 1/2015 | Kim et al. |
| 2017/0288408 | A1 | 10/2017 | Kim et al. |
| 2018/0248364 | A1 | 8/2018 | Shaver et al. |
| 2020/0106272 | A1 | 4/2020 | Yu et al. |
| 2022/0311354 | A1* | 9/2022 | Gerçek .............. H02M 7/5395 |

FOREIGN PATENT DOCUMENTS

| CN | 107154642 A | 9/2017 |
| CN | 107154780 A | 9/2017 |
| CN | 110492592 A | 11/2019 |

OTHER PUBLICATIONS

Australian Office Action regarding Application No. 2020277277 dated Jan. 4, 2022.
First Chinese Office Action regarding Application No. 202010749781.X dated Jul. 23, 2021. English translation provided by Unitalen Attorneys at Law.
Extended European Search Report regarding Application No. 20207018.1 dated Jul. 29, 2021.

* cited by examiner

METHOD FOR CONTROLLING OPERATION OF MLPE DEVICE, METHOD FOR CONTROLLING MLPE DEVICES, AND PHOTOVOLTAIC SYSTEM

The present application claims priority to Chinese Patent Application No. 202010749781.X, titled "METHOD FOR CONTROLLING OPERATION OF MLPE DEVICE, METHOD FOR CONTROLLING MLPE DEVICES, AND PHOTOVOLTAIC SYSTEM", filed on Jul. 30, 2020 with the China National Intellectual Property Administration, which is incorporated herein by reference in its entirety.

FIELD

The present disclosure relates to the technical field of a photovoltaic power generation, and in particular to a method for controlling operation of a module level power electronics (MLPE) device, a method for controlling MLPE devices, and a photovoltaic system.

BACKGROUND

A direct current (DC) side of a photovoltaic system includes a photovoltaic array formed by multiple photovoltaic modules connected in series or in parallel, and an output voltage of the photovoltaic array may reach to several hundred volts or even kilovolt. Therefore, when a maintenance personnel of the photovoltaic system or other personnel approach the photovoltaic array, serious safety accidents may occur.

In the conventional technology, in order to ensure the safety of the maintenance personnel, a shutdown circuit is arranged in each of the multiple photovoltaic modules, and a host device is arranged in the photovoltaic system. The host device controls the shutdown circuit to be started up or shut down via communication technology, so as to control the whole photovoltaic array to be within a safe voltage (such as 30V) when it is required. However, due to an arrangement of a communication host and a communication circuit, the cost of the photovoltaic system is high.

Another improvement solution in which a voltage coding signal or a current coding signal is formed based on a converter chopped wave in an inverter is further provided according to the conventional technology. In the solution, a coding signal is formed in the voltage or the current on the DC side of the photovoltaic system, to inform a device on the DC side to perform an operation corresponding to the coding signal (such as shut down or start up), which can cancel the appropriative communication circuit and save the cost of the photovoltaic system. However, the inverter is in a standby state or a power limiting operation state, the photovoltaic module is approximately an open-circuit. As shown in FIG. 1, the shutdown circuit operates at a right side of a maximum power point (that is, the point corresponding to Pmax in FIG. 1). In a case that an open-circuit voltage is high, even if a voltage of the inverter has a small fluctuation, for example the voltage is changed from Voc to V1, a larger power may be generated (such as P1 in FIG. 1). The power may exceed a power that the inverter can consume in the standby state, or exceed a threshold for power limiting operation of the inverter, resulting in a failure of chopped wave coding, so that the shutdown circuit cannot receive the coding and gets into a shutdown mode, and the photovoltaic system is powered down and locked.

SUMMARY

In view of this, a method for controlling operation of a module level power electronics (MLPE) device, a method for controlling MLPE devices, and a photovoltaic system are provided according to embodiments of the present disclosure, so as to realize a control of a former shutdown circuit at a low cost, and avoid a failure of chopped wave coding caused by a voltage fluctuation of an inverter.

To achieve the above objectives, the following technical solutions are provided according to the embodiments of the present disclosure.

A method for controlling operation of a MLPE device is provided according to a first aspect of the present disclosure. The method is applied to the MLPE device. The MLPE device includes a switching device connected in series with a photovoltaic module corresponding to the MLPE device. The method includes: detecting a current of a photovoltaic string where the MLPE device is located; determining whether the current of the photovoltaic string is less than a current threshold and coding information sent by a converter in a photovoltaic system is not received for a first preset time period; and controlling, if it is determined that the current of the photovoltaic string is less than the current threshold and the coding information sent by the converter is not received for the first preset time period, an output voltage or an output power of the MLPE device to be less than a corresponding threshold.

In an embodiment, the controlling an output voltage or an output power of the MLPE device to be less than a corresponding threshold includes: controlling the switching device to switch with a fixed cycle and a fixed duty cycle, to reduce the output voltage and the output power of the MLPE device.

In an embodiment, the controlling an output voltage or an output power of the MLPE device to be less than a corresponding threshold includes: controlling the switching device to switch, to cause the output voltage of the MLPE device to be less than a first preset voltage threshold.

In an embodiment, before controlling the output voltage or the output power of the MLPE device to be less than the corresponding threshold, the method further includes: detecting an input voltage of the MLPE device, and determining whether the input voltage is greater than a second preset voltage threshold; and controlling, if it is determined that the input voltage is greater than the second preset voltage threshold, the output voltage or the output power of the MLPE device to be less than the corresponding threshold.

In an embodiment, after controlling the output voltage or the output power of the MLPE device to be less than the corresponding threshold, the method further includes: determining whether the coding information is not received for a second preset time period, where the second preset time period is greater than the first preset time period; and controlling, if the coding information is not received for the second preset time period, the output voltage of the MLPE device to be less than a third preset voltage threshold.

In an embodiment, the controlling the output voltage of the MLPE device to be less than a third preset voltage threshold includes: controlling the switching device to be turned off.

In an embodiment, the coding information is at least one of a voltage fluctuation and a current fluctuation on an input side of the converter.

A method for controlling module level power electronics (MLPE) devices is provided according to a second aspect of the disclosure. The method is applied to a converter of a photovoltaic system. A former circuit of the converter is connected with at least one photovoltaic string. Each photovoltaic string includes multiple photovoltaic modules connected in series with each other via the MLPE devices corresponding to the photovoltaic modules. The method includes: periodically determining whether an input voltage of the converter is less than a fourth preset voltage threshold; continuously generating and outputting, if the input voltage of the converter is less than the fourth preset voltage threshold, coding information to each of the MLPE devices in the former circuit of the converter, to cause each of the MLPE devices to be in a normal operation state; and stopping generating the coding information, if the input voltage of the converter is greater than or equal to the fourth preset voltage threshold, to cause an output voltage or an output power of each of the MLPE devices to be less than a corresponding threshold.

In an embodiment, after or before any one step in the method for controlling MLPE devices, the method further includes: stopping generating the coding information, if a photovoltaic shutdown command is received, to cause the output voltage of each of the MLPE devices to be less than a third preset voltage threshold; and performing again, if a photovoltaic startup command is received, the step of periodically determining whether the input voltage of the converter is less than the fourth preset voltage threshold.

In an embodiment, the coding information is at least one of a voltage fluctuation and a current fluctuation on an input side of the converter.

A photovoltaic system is provided according to a third aspect of the disclosure. The photovoltaic system includes a converter and a photovoltaic array in a former circuit of the converter. The photovoltaic array includes at least one photovoltaic string. Each photovoltaic string includes multiple photovoltaic modules connected in series with each other via module level power electronics (MLPE) devices corresponding to the photovoltaic modules. Each MLPE device includes a switching device connected in series with the photovoltaic module corresponding to the MLPE device. Each MLPE device is configured to perform the method for controlling operation of the MLPE device described above. The converter is configured to perform the method for controlling the MLPE devices described above.

In an embodiment, the MLPE device is a power optimizer or a shutdown device.

In an embodiment, the converter includes a controller and a main circuit. An input end of the main circuit is connected with the photovoltaic array via an input side of the converter. The controller is connected with the main circuit.

In an embodiment, the main circuit is a direct current/direct current (DC/DC) conversion circuit or a direct current/alternating current (DC/AC) conversion circuit. A direct current side of the DC/DC conversion circuit or a direct current side of the DC/AC conversion circuit is used as the input end of the main circuit.

Based on the above method for controlling the operation of the MLPE device according to the embodiments of the present disclosure, the MLPE device arranged at the output end of each photovoltaic module detects the current of the photovoltaic string where the MLPE device is located, if it is determined that the current of the photovoltaic string is less than the current threshold and the coding information sent by the converter in the photovoltaic system is not received for the first preset time period, it is determined that the converter may currently be in a standby state or a power limiting operation state, while the photovoltaic string may be approximately an open-circuit. Therefore, the output voltage or the output power of the MLPE device is controlled to be less than the corresponding threshold, the shutdown circuit is adjusted to be in an operation condition of a left side of a maximum power point, so as to avoid that power received by the converter exceeds power that the inverter can consume in the standby state, or exceeds a threshold for power limiting operation of the inverter because of a voltage fluctuation of an inverter. Furthermore, it can avoid that the chopped wave coding is failed, the shutdown circuit cannot receive the coding and gets into a shutdown mode, and the photovoltaic system is powered down and locked. In addition, the shutdown circuit is not shut down completely, and the converter has the power supply. In addition, the MLPE device can be controlled by the coding information sent by the converter according to the solutions of the present disclosure, and therefore the function of controlling the MLPE device in a former circuit of the converter at a low cost can be realized.

BRIEF DESCRIPTION OF THE DRAWINGS

In order to illustrate technical solutions in embodiments of the present disclosure or the conventional technology more clearly, hereinafter drawings to be used in the description of the embodiments or the conventional technology are introduced simply. Apparently, the drawings described below are only for the embodiments of present disclosure. For those skilled in the art, other drawings may be obtained based on the provided drawings without any creative work.

DETAILED DESCRIPTION

Technical solutions of embodiments of the present disclosure will be clearly and completely described hereinafter in conjunction with the drawings of the embodiments according to the present disclosure. Apparently, the embodiments described are only part embodiments of the present disclosure, rather than all embodiments. Any other embodiments obtained by those skilled in the art based on the embodiments in the present disclosure without any creative work fall in the scope of protection of the present disclosure.

Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless expressively limited, the statement "including a . . . " does not exclude the case that other similar elements may exist in the process, the method, the article or the device other than enumerated elements.

In order to solve a problem that in a case that a shutdown circuit is in an operation condition of a right side of a maximum power point in a curve according the conventional technology, a converter cannot generate coding information in a high-voltage startup or a power limiting operation mode, a method for controlling operation of a module level power electronics (MLPE) device is provided according to embodiments of the present disclosure, to realize a control of the former shutdown circuit at a low cost, and avoid a failure of chopped wave coding caused by a voltage fluctuation of an inverter.

Figure 1:
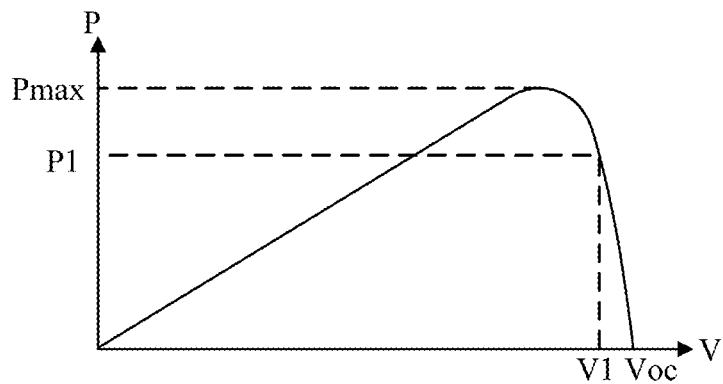
FIG. 1 is a PV curve diagram of a shutdown circuit according to the conventional technology.
Figure 2:
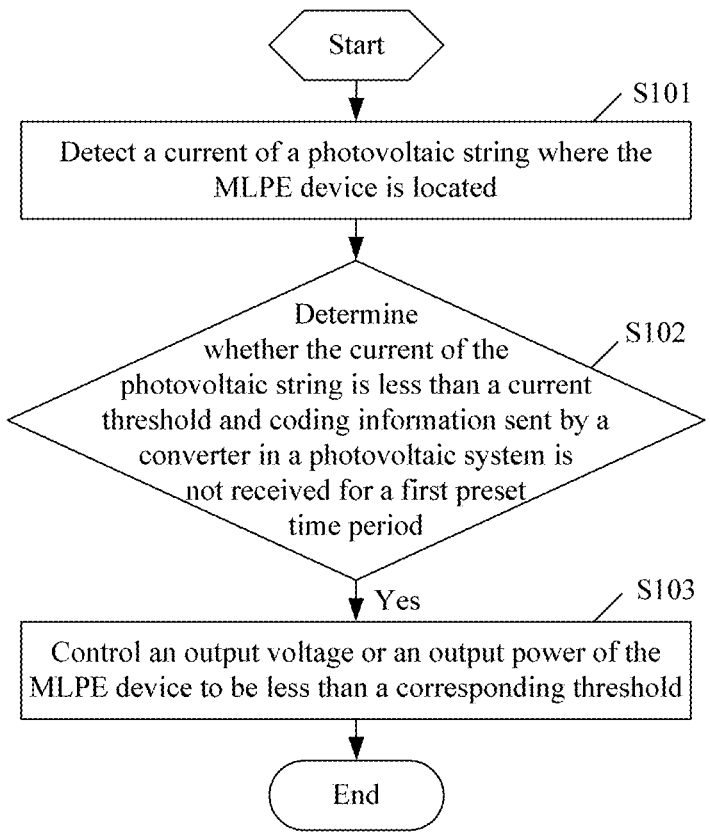
FIG. 2 is a flow chart of a method for controlling operation of a MLPE device according to an embodiment of the present disclosure.

The method for controlling operation of a MLPE device is applied to the MLPE device. The MLPE device includes a switching device connected in series with a photovoltaic module corresponding to the MLPE device. A flow chart of the method for controlling operation of a MLPE device is shown in FIG. 2, and the method includes steps S101 to S103.

In step S101, it is detected a current of a photovoltaic string where the MLPE device is located.

The MLPE device may be a power optimizer for performing maximum power point tracking (MPPT) on the photovoltaic module, and may further be a shutdown device for shutting down the photovoltaic module, which is not limited herein. In addition, the MLPE device includes a detection apparatus, such as a current sensor, to detect the current of the photovoltaic string where the MLPE device is located.

In step S102, it is determined whether the current of the photovoltaic string is less than a current threshold and coding information sent by a converter in a photovoltaic system is not received for a first preset time period.

In practices, the current threshold may be set by technicians based on the actual application, for example the current threshold is set to 0.5 A. As long as a current threshold meets a condition that the current of the photovoltaic string is less than the current threshold when the converter is in a standby state or a power limiting operation state, the current threshold falls within the protection scope of the present disclosure.

The coding information is at least one of a voltage fluctuation and a current fluctuation on a direct current (DC) bus of the converter in the photovoltaic system, so that the MLPE device can be controlled by the converter, to avoid using an appropriative communication circuit and save a cost of the photovoltaic system. Under normal conditions, the converter continuously outputs the coding information to maintain an on-state of each of the MLPE devices in a former circuit of the converter. In a case that a photovoltaic shutdown command is received, the converter stops outputting the coding information, so that each of the MLPE devices in a former circuit of the converter is in an off-state and gets into a safe mode. In a case that the converter is in the standby state or the power limiting operation state, if each of the MLPE devices in a former circuit of the converter is in the on-state, a voltage stress of each chopper switching device in the main circuit of the converter is large. Therefore, the converter may be controlled to stop outputting the coding information for the first preset time period, so that each of the MLPE devices does not receive the coding information sent by the converter in the photovoltaic system for the first preset time period, and then it is determined that the converter is in the standby state or the power limiting operation state. The first preset time period may be set by technicians based on the actual application.

If it is determined that the current of the photovoltaic string is less than the current threshold and the coding information sent by the converter is not received for the first preset time period in step S102, step S103 is performed.

In step S103, an output voltage or an output power of the MLPE device is controlled to be less than a corresponding threshold. That is, the output voltage of the MLPE device is controlled to be less than an output voltage threshold, or the output power of the MLPE device is controlled to be less than an output power threshold.

If the current of the photovoltaic string exceeds the current threshold (such as 0.5 A), it is determined that the photovoltaic system is in a normal operation state and the switching device, connected in series with the photovoltaic module, in the MLPE device is turned on, the photovoltaic module outputs normally. However, if it is determined that the current of the photovoltaic string is less than the current threshold and the coding information sent by the converter in the photovoltaic system is not received for the first preset time period, it is indicated that the converter may be currently in the standby state or the power limiting operation state. The photovoltaic module may approximately be in an open-circuit state, and the voltage stress of the chopper switching device in the converter is large. Therefore, the output voltage or the output power of the MLPE device is controlled to be less than the corresponding threshold and the MLPE device gets into a moderation mode. In this way, a voltage of a photovoltaic string formed by connecting multiple MLPE devices in series is reduced, and the voltage stress of the chopper switching device in the converter is reduced. The output voltage threshold and the output power threshold may be set by technicians based on the actual application, which are not limited herein.

There are two preferred ways for the MLPE device to control the output voltage or the output power of the MLPE device to be less than the corresponding threshold. A first preferred way is that the switching device connected in series with the photovoltaic module corresponding to the MLPE device is controlled to switch with a fixed cycle and a fixed duty cycle, so as to reduce the output voltage and the output power of the MLPE device. A second preferred way is that the switching device is controlled to switch, so as to cause the output voltage of the MLPE device to be less than a first preset voltage threshold.

For the first preferred way, for example, a cycle is 2 s, the switching device is controlled to switch in a mode of 1 s on and 1 s off, which can reduce the output voltage of the MLPE device to about half of a voltage of the photovoltaic module, which is not limited herein. As long as the output voltage and the output power of the MLPE device can be reduced, other cycles and duty cycles are all fall within the protection scope of the present disclosure.

For the second preferred way, for example, the output voltage of the MLPE device may be detected, to further control the switching device to switch, so that the output voltage of the MLPE device is less than the first preset voltage threshold, such as 20V. However, it should be noted that if the MLPE device is a power optimizer, the output voltage of the MLPE device can be accurately controlled to a certain value. If the MLPE device is a shutdown device, since an output end of the MLPE device does not have a large supporting capacitance and a switching frequency of the MLPE device cannot be higher, the output voltage of the MLPE device cannot be steadily controlled to a certain value. However, an equivalent converter may be formed by fully using inductances of an output cable, inductances and capacitances of the converter in a subsequent circuit of the MLPE device, so that the output voltage of the MLPE device outputted to the converter is relatively stable.

Figure 3:
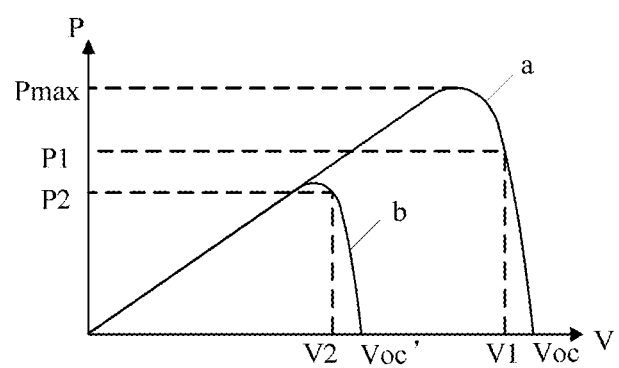
FIG. 3 is a PV curve diagram showing that an output voltage or an output power of a MLPE device is controlled to be less than a corresponding threshold in a method for controlling operation of a MLPE device according to an embodiment of the present disclosure.

Taking the first preferred way as an example, as shown in FIG. 3, a curve a is a PV curve of a shutdown circuit according to the conventional technology, while a curve b is a PV curve of the MLPE device according to the embodiment of the present disclosure. It can be seen that in a case that both the shutdown circuit according to the conventional technology and the MLPE device according to the embodiment are in the power limiting operation state (right side of the maximum power point corresponding to Pmax), the multiple MLPE devices in a photovoltaic string according to the embodiment operate in the mode (the cycle is 2 s, and the switching device is controlled to switch in the mode of 1 s on and 1 s off), an equivalent open-circuit voltage of the photovoltaic string is decreased to Voc', and the voltage stress of the converter is reduced. In addition, in a case that a same voltage fluctuation (the fluctuation from Voc' to V2) occurs, power P2 to be processed in this embodiment is also lower than the power P1 to be processed in the conventional technology, and therefore a power stress is also reduced.

In view of a problem that a slope of the curve on the right side of the maximum power point is large, and the shutdown circuit cannot be controlled according to the solutions of the conventional technology. In the method for controlling the operation of the MLPE device according to the embodiment of the present disclosure, if it is determined that the converter may currently be in a standby state or a power limiting operation state, and then the switching device, connected in series with the photovoltaic module corresponding to the MLPE device, in the MLPE device is controlled to switch to enter into the moderation mode and the output voltage or the output power of the MLPE device is controlled to be less than the corresponding threshold. The shutdown circuit is adjusted to be in an operation condition of a left side of a maximum power point, so as to avoid that power received by the converter exceeds power that the inverter can consume in the standby state, or exceeds a threshold for power limiting operation of the inverter because of a voltage fluctuation of an inverter. Furthermore, it can avoid that the chopped wave coding is failed, the shutdown circuit cannot receive the coding and gets into a shutdown mode, and the photovoltaic system is powered down and locked. In addition, the shutdown circuit is not shut down completely, and the converter has the power supply.

In addition, the MLPE device can be controlled by the coding information sent by the converter according to the solutions of the present disclosure, and therefore the function of controlling the MLPE device in a former circuit of the converter at a low cost can be realized. In addition, by setting the threshold for the output voltage, the voltage stress of the chopper switching device in the converter can be reduced when the photovoltaic module is approximately an open-circuit, and the reliability of the converter can be improved.

Figure 4:
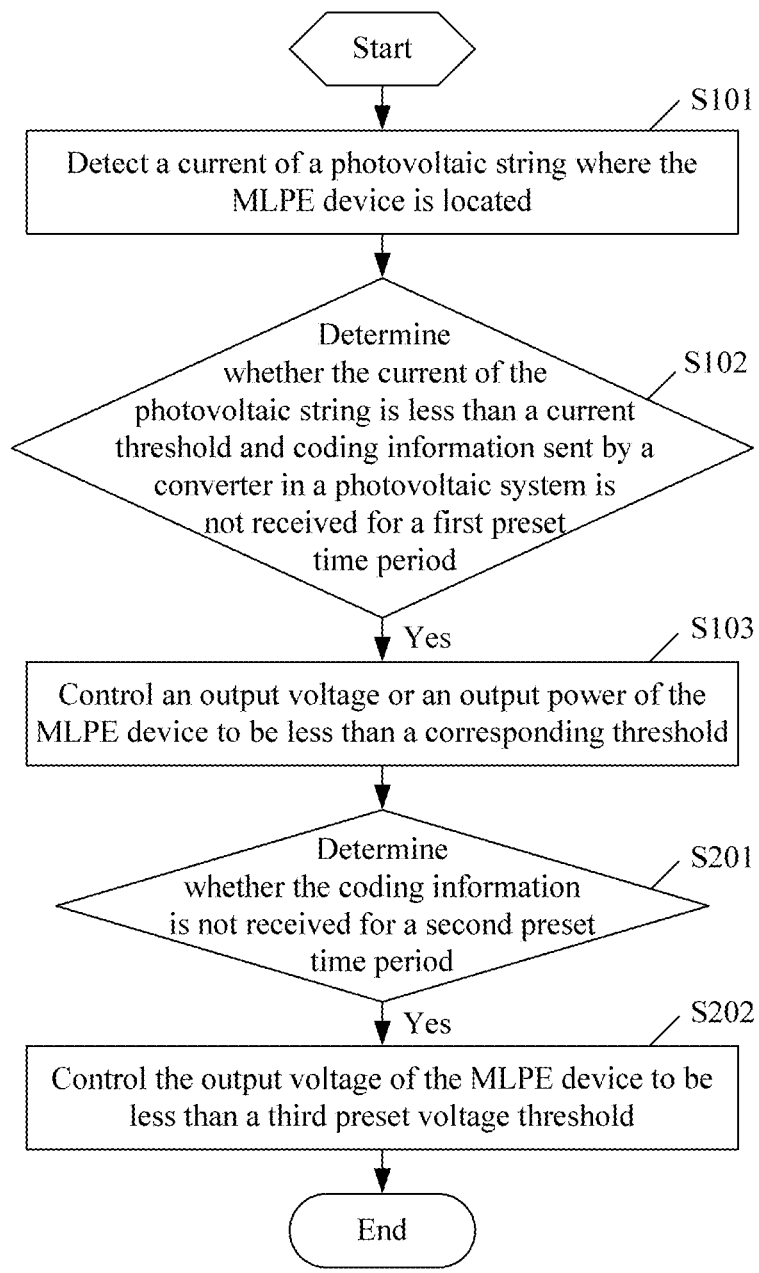
FIG. 4 is a flow chart of a method for controlling operation of a MLPE device according to another embodiment of the present disclosure.

A method for controlling operation of the MLPE device is further provided according to another embodiment of the present disclosure. A flow chat of the method is shown in FIG. 4. After the step S103 in the above embodiment, the method further includes steps S201 and S202.

In step S201, it is determined whether the coding information is not received for a second preset time period. If the coding information is not received for the second preset time period, step S202 is performed.

In step S202, the output voltage of the MLPE device is controlled to be less than a third preset voltage threshold.

The second preset time period is greater than the first preset time period. Therefore, if the coding information is not received for the second preset time period, it is determined that the converter receives a photovoltaic shutdown command and then stops generating the coding information. The switching device connected in series with the photovoltaic module in the MLPE device is controlled to be turned off, to further control the output voltage of the MLPE device to be less than the third preset voltage threshold. The third preset voltage threshold may be a zero or a very small value near zero, which are all fall within the protection scope of the present disclosure.

The principles for remaining parts are the same as the principles described in the above embodiments, which are not be repeated herein.

Figure 5:
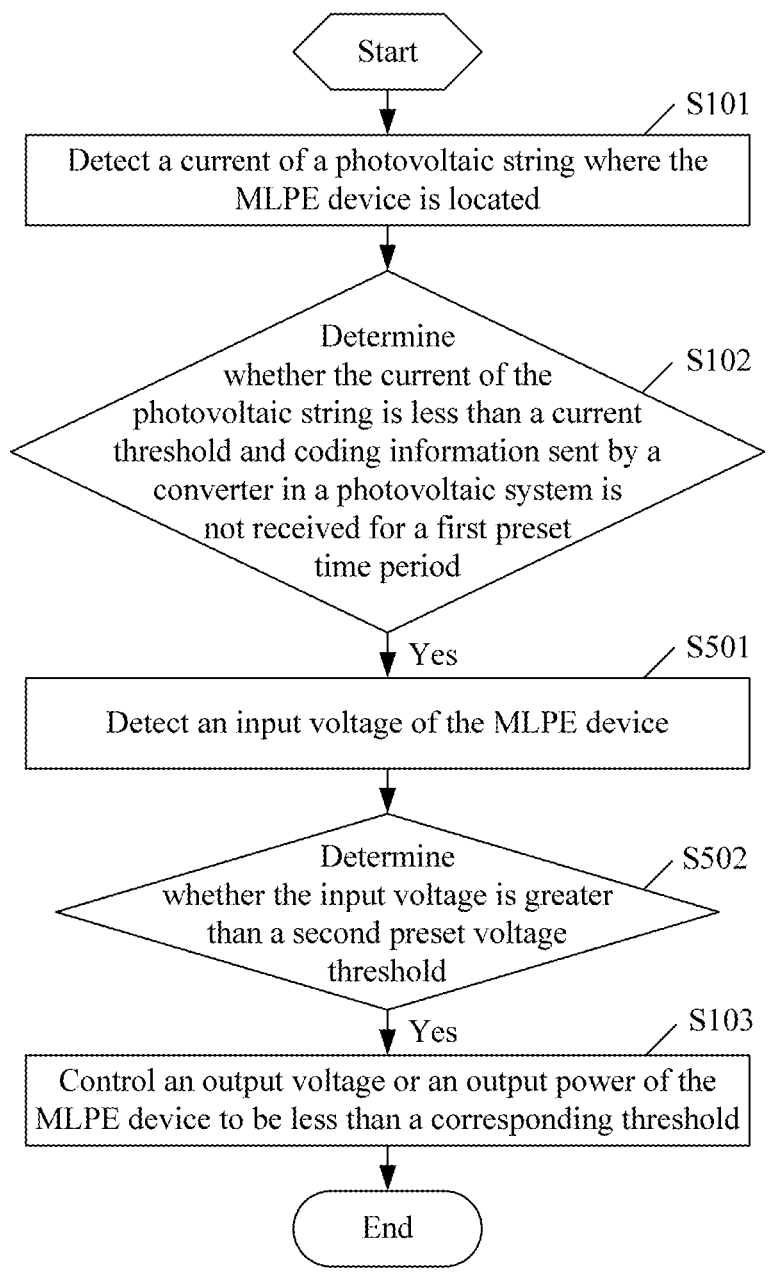
FIG. 5 is a flow chart of a method for controlling operation of a MLPE device according to another embodiment of the present disclosure.

A method for controlling operation of the MLPE device is further provided according to another embodiment of the present disclosure. In the above embodiment, if the current of the photovoltaic string is less than the current threshold and the coding information sent by the converter in the photovoltaic system is not received for the first preset time period, the photovoltaic system may not be in the standby state or the power limiting operation state, but the current of the photovoltaic string is small in a normal operation state. For example, in a state of weak light in the morning or evening, the current of the photovoltaic string is small, in this case, if the output voltage or the output power of the MLPE device is controlled to be less than the corresponding threshold, a loss of power generation may occur. Therefore, based on the above embodiments, before the output voltage or the output power of the MLPE device is controlled to be less than the corresponding threshold, the method further includes the steps S501 and S502, and a flow chart of the method is shown in FIG. 5.

In step S501, an input voltage of the MLPE device is detected.

By detecting the input voltage of the MLPE device, it may be determined whether to reduce the output voltage or the output power of the MLPE device by comprehensively considering the input voltage and the current of the photovoltaic string.

In step S502, it is determined whether the input voltage is greater than a second preset voltage threshold.

In practices, the second preset voltage threshold may be set by technicians based on the actual application, which is not limited herein. If it is determined that the input voltage is greater than the second preset voltage threshold, step S103 is performed.

Figure 6:
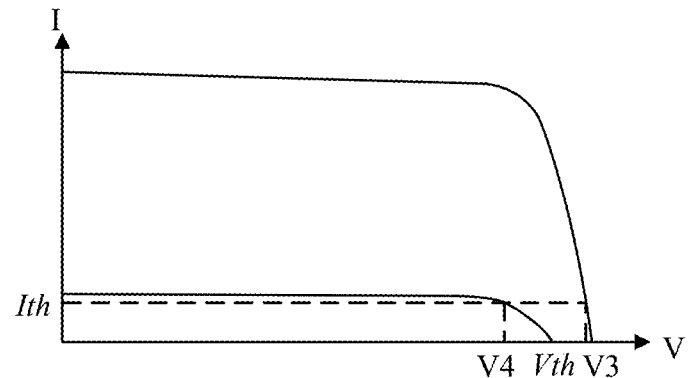
FIG. 6 is an IV curve diagram of a photovoltaic module under different illumination conditions in a method for controlling operation of a MLPE device according to another embodiment of the present disclosure.

FIG. 6 is an IV curve diagram of the photovoltaic module under different illumination conditions. It can be seen that if the current of the photovoltaic string is less than a current threshold Ith, and then it is determined whether the input voltage of the MLPE device, that is, the output voltage of the photovoltaic module is greater than the second preset voltage threshold Vth. If the input voltage of the MLPE device is greater than the second preset voltage threshold Vth, for example the input voltage of the MLPE device is V3, it is determined that the photovoltaic module is under strong light. The low current of the photovoltaic string is caused by the converter in the standby state or the limiting power operation state. Therefore, the output voltage or the output power of the MLPE device is controlled to be less than the corresponding threshold.

Alternatively, if the input voltage of the MLPE device is less than the second preset voltage threshold Vth, for example the input voltage of the MLPE device is V4, it is determined that the photovoltaic module is under low light, which results in low current of the photovoltaic string. Therefore, the output voltage and the output power of the photovoltaic module outputted to the converter are lower, that is, the voltage stress of the chopper switching device in the converter is not large, therefore the MLPE device is controlled to maintain being on-state, and there is no need to control the output voltage or the output power of the MLPE device to be less than the corresponding threshold.

In the method for controlling operation of the MLPE device according to the present disclosure, before controlling the output voltage or the output power of the MLPE device to be less than the corresponding threshold, the input voltage and the current of the photovoltaic string are comprehensively considered to avoid a loss of power generation caused by an error determination.

The principles for remaining parts are the same as the principles described in the above embodiments, which are not be repeated herein.

Figure 7:
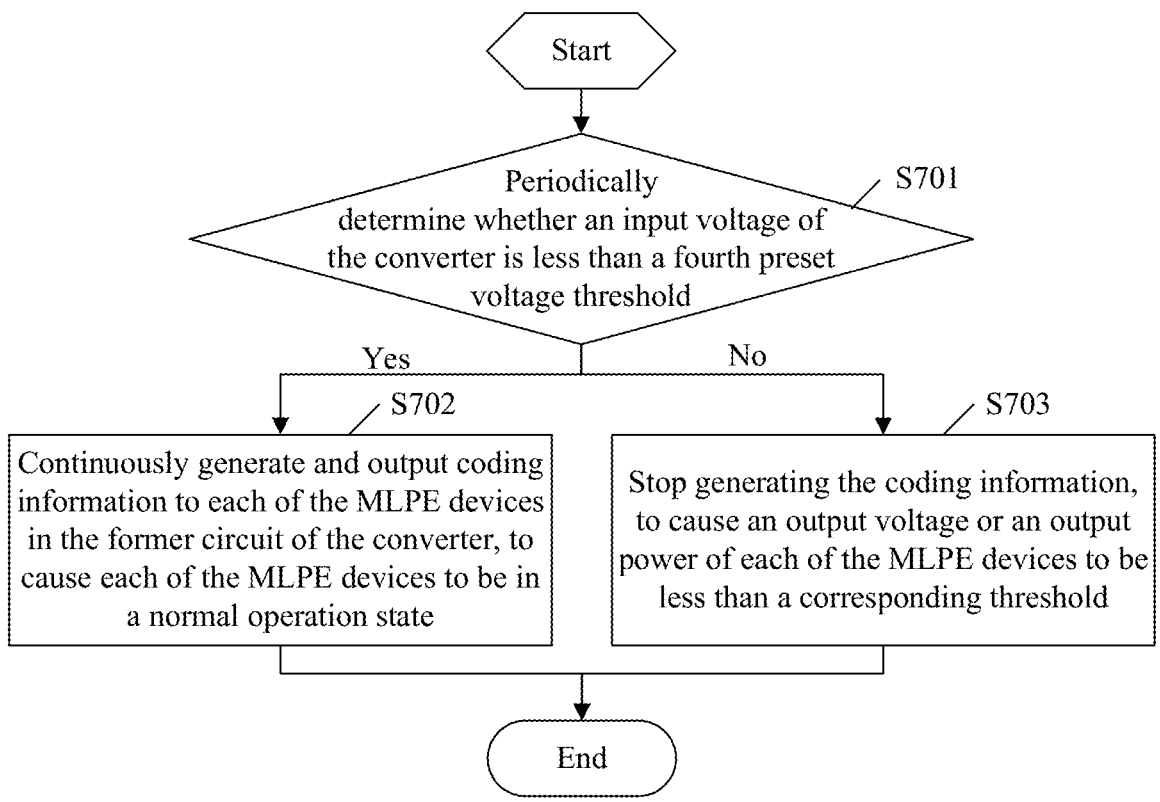
FIG. 7 is a flow chart of a method for controlling MLPE devices according to another embodiment of the present disclosure.

A method for controlling MLPE devices is further provided according to another embodiment of the present disclosure. The method is applied to a converter of a photovoltaic system. A former circuit of the converter is connected with at least one photovoltaic string. Each photovoltaic string includes multiple photovoltaic modules connected in series with each other via the MLPE devices corresponding to the photovoltaic modules. A flow chart of the method is shown in FIG. 7, and the method includes steps S701 to S703.

In step S701, it is periodically determined whether an input voltage of the converter is less than a fourth preset voltage threshold.

In a case that the converter does not receive a photovoltaic shutdown command, the input voltage of the converter is periodically detected and determined. And the period of detection and determination may be set by technicians based on the actual application, and real-time detection and determination may also be performed, which are all fall within the protection scope of the present disclosure. And the fourth preset voltage threshold may be set by technicians based on the actual application. For example, the fourth preset voltage threshold may be 550V, which is not limited herein.

If the input voltage of the converter is less than the fourth preset voltage threshold, step S702 is performed, and if the input voltage of the converter is greater than or equal to the fourth preset voltage threshold, step S703 is performed.

In step S702, coding information is continuously generated and outputted to each of the MLPE devices in the former circuit of the converter, to cause each of the MLPE devices to be in a normal operation state.

In a case that the input voltage of the converter is less than the fourth preset voltage threshold, such as 550V, the converter is controlled to be in a chopped wave operation, that is, the normal operation state, and therefore the converter can continuously generates and outputs the coding information.

In step S703, the converter stops generating the coding information, to cause an output voltage or output power of each of the MLPE devices to be less than a corresponding threshold.

If the input voltage of the converter is greater than or equal to the fourth preset voltage threshold, the converter is controlled to enter into a standby mode, to stop generating the coding information, so as to cause the output voltage of each of the MLPE devices to be less than a third preset voltage threshold, that is, each of the MLPE devices is controlled to enter into a safe mode. Therefore, the third preset voltage threshold may be a zero or a very low voltage, but which is not limited herein. A voltage of the photovoltaic string is further controlled to be less than a safe voltage, such as 30V.

After the output voltage or the output power of each of the MLPE devices is controlled to be less than the corresponding threshold, the input voltage of the converter is less than the fourth preset voltage threshold, and the converter may continue to generate the coding information, so that each of the MLPE devices returns to the normal operation.

It should be noted that in a process of performing above steps S701 to S703, if the converter receives a photovoltaic shutdown command, the converter immediately stops generating the coding information, to cause the output voltage of each of the MLPE devices to be less than the third preset voltage threshold, if a photovoltaic startup command is received, step S701 is performed again.

The principles for remaining parts are the same as the principles described in the above embodiments, which are not be repeated herein.

Figure 8:
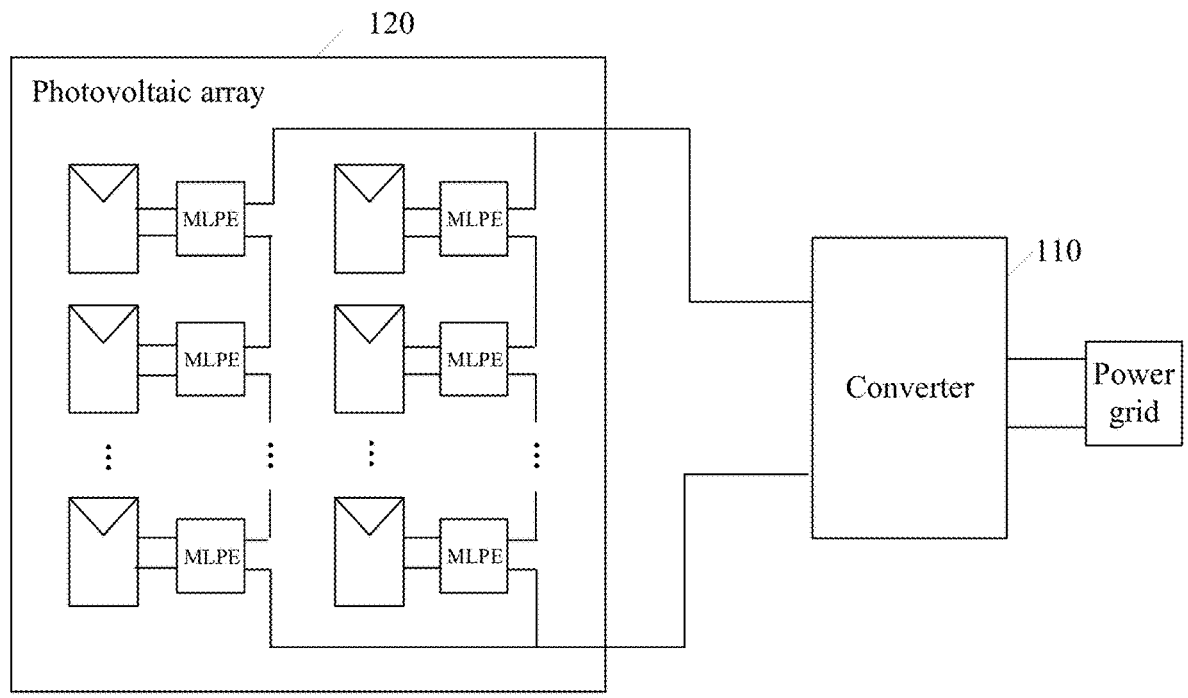
FIG. 8 is a schematic structural diagram of a photovoltaic system according to another embodiment of the present disclosure.

A photovoltaic system is provided according to another embodiment of the disclosure. A schematic structural diagram of the photovoltaic system is shown in FIG. 8. The photovoltaic system includes a converter 110 and a photovoltaic array 120 in a former circuit of the converter 110. The photovoltaic array 120 includes at least one photovoltaic string, such as multiple photovoltaic strings connected in parallel. Each photovoltaic string includes multiple photovoltaic modules connected in series with each other via MLPE devices corresponding to the photovoltaic modules. Each MLPE device includes a switching device connected in series with the photovoltaic module corresponding to the MLPE device. Each MLPE device is configured to perform the method for controlling operation of the MLPE device according to the above embodiment. The converter 110 is configured to perform the method for controlling the MLPE devices according to the above embodiment.

Figure 9:
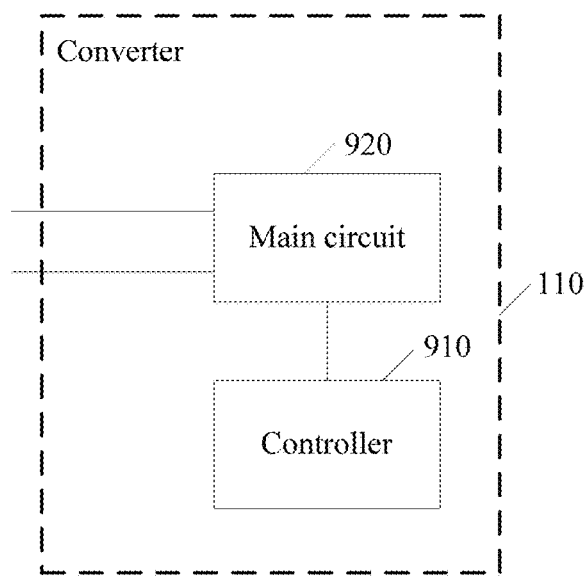
FIG. 9 is a schematic structural diagram of a converter in a photovoltaic system according to another embodiment of the present disclosure.

A schematic structural diagram of the converter 110 is shown in FIG. 9. The converter 110 includes a controller 910 and a main circuit 920. An input end of the main circuit 920 is connected with the photovoltaic array via a DC bus. The controller 910 is connected with the main circuit 920. In practices, a voltage/current fluctuation may be generated by using the main circuit 920 and is outputted to the DC bus, so as to cause the MLPE device to receive the coding information. Alternatively, the voltage/current fluctuation may be also generated by using an additional starting device and is outputted to the DC bus, so as to cause the MLPE device to receive the coding information, so that an arrangement cost of a communication device can similarly be avoided, which are all fall within the protection scope of the present disclosure.

In practices, the main circuit 920 may be a direct current/direct current (DC/DC) conversion circuit or a direct current/alternating current (DC/AC) conversion circuit for power conversion. A direct current side of the DC/DC conversion circuit or a direct current side of the DC/AC conversion circuit is used as the input end of the main circuit 920. For a photovoltaic inverter, the DC/DC conversion is commonly a Boost conversion circuit. For an energy storage converter, the DC/DC conversion is commonly a bi-directional charge and discharge DC/DC conversion circuit.

Therefore, the converter 110 performs the method for controlling the MLPE devices according to the above embodiment as follows. Step S701 is performed by the controller 910, and steps S702 and S703 are performed by the main circuit 920. After step S701 is performed by the controller 910, if the converter 110 is in the standby state or the power limiting operation state, the output voltage of the photovoltaic module is high, the main circuit 920 stops operation or operates with reduced power, and the DC bus voltage also increases. If the determination result of step S701 is that the input voltage of the converter is greater than or equal to the fourth preset voltage threshold, step S703 is performed by the main circuit 920.

Figure 10:
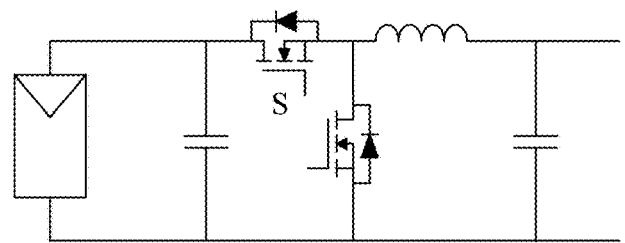
FIG. 10 is a schematic structural diagram of a MLPE device being a power optimizer in a photovoltaic system according to another embodiment of the present disclosure.
Figure 11:
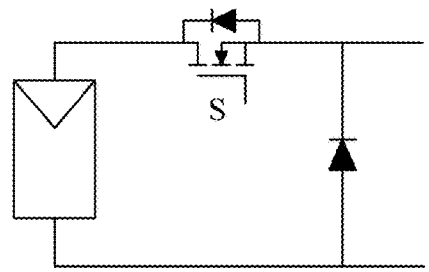
FIG. 11 is a schematic structural diagram of a MLPE device being a shutdown device in a photovoltaic system according to another embodiment of the present disclosure.

The MLPE device in the photovoltaic array 120 may be a power optimizer for performing maximum power point tracking (MPPT) on the photovoltaic module, or a shutdown device for shutting down the photovoltaic module, which are not limited herein. If the MLPE device is the power optimizer, a schematic structural diagram of the MLPE device is shown in FIG. 10. If the MLPE device is the shutdown device, a schematic structural diagram of the MLPE device is shown in FIG. 11. No matter whether the MLPE device is the power optimizer or the shutdown device, the MLPE device includes the switching device S connected in series with the photovoltaic module.

Figure 12:
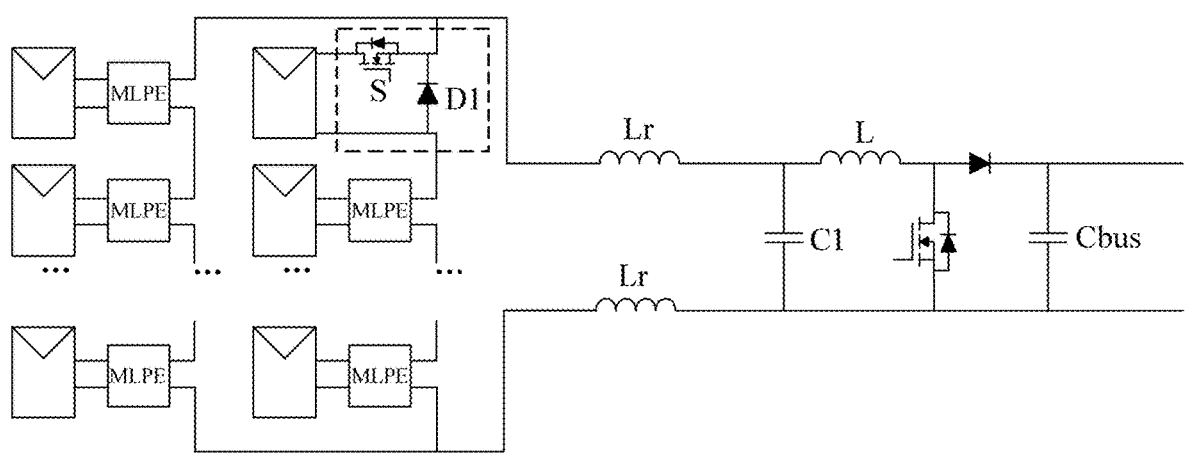
FIG. 12 is a schematic structural diagram of an equivalent Buck circuit formed by a MLPE device being a shutdown device and a subsequent circuit of MLPE device in a photovoltaic system according to another embodiment of the present disclosure.

It should be noted that when the MLPE device performs the method for controlling the MLPE devices according to the above embodiments of the present disclosure, if the MLPE device is the power optimizer, the output voltage or the output power of the MLPE device may be accurately controlled to be less than the corresponding threshold, such as 20V. However, if the MLPE device is the shutdown device, since the output end of the MLPE device does not have the large supporting capacitance and the switching frequency of the MLPE device cannot be higher, the output voltage of the MLPE device cannot be steadily controlled to a certain value. Therefore, the equivalent converter may be formed by fully using inductances of the output cable, inductances and capacitances of the converter in a subsequent circuit of the MLPE device, so that the output voltage of the MLPE device outputted to the converter is relatively stable. As shown in FIG. 12, a Buck circuit is formed by using a switching device S and a diode D1 in the shutdown device, an equivalent inductance Lr of the output cable and an input capacitance C1 of the converter, so that a voltage of the input capacitance C1 of the converter is relatively stable and small, where C1 is the capacitance of the input side of the converter. In addition, a Buck circuit is further formed by using the switching device S and the diode D1 in the shutdown device, an inductance L and a bus capacitance Cbus of the converter, the inductance and capacitance of this Buck circuit are larger, and therefore the voltage of the bus capacitance Cbus of the converter is more stable.

The photovoltaic system according to the embodiment of the present disclosure performs the method according to the above embodiment by software algorithm, and the cost of the hardware does not increase.

The principles for remaining parts are the same as the principles described in the above embodiments, which are not be repeated herein.

The embodiments of the present disclosure are described in a progressive manner, the same or similar parts among the embodiments can be referred to each other, and each embodiment places emphasis on the difference from other embodiments. In particular, for the system or the embodiment of the system, since they are similar to the embodiment of the method, the description of the system or the embodiment of the system is simple, and reference may be made to the relevant part of the embodiment of the method. The above-described system and the embodiments of the system are only schematic. A unit described as a separated component may be physically separated or not. Components shown as units may be physical units or not, i.e. the components may be located in one place or may be distributed onto multiple network units. A part of or all modules may be selected if desired to realize the object of the embodiments. Those skilled in the art can understand and implement the embodiments without any creative work.

It may be known by those skilled in the art that, units and steps described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on applications of the technical solution and design constraint conditions. Those skilled in the art can use different method for each application to realize the described function, and this is not considered to be beyond the scope of the present disclosure.

The description of the embodiments herein enables the person skilled in the art to implement or use the present disclosure. Various modifications to the embodiments are apparent to the person skilled in the art, and the general principle defined herein can be implemented in other embodiments without departing from the spirit or scope of the present disclosure. Therefore, the present disclosure is not limited to the embodiments described herein, but should be in accordance with the broadest scope consistent with the principle and novel features disclosed herein.

The invention claimed is:

1. A method for controlling operation of a module level power electronics (MLPE) device, the method applied to the MLPE device, the MLPE device comprising a switching device connected in series with a photovoltaic module corresponding to the MLPE device, and the method comprising:
    detecting a current of a photovoltaic string where the MLPE device is located;
    determining whether the current of the photovoltaic string is less than a current threshold and coding information generated by a chopper switching device in a converter in a photovoltaic system and sent by the converter is not received for a first preset time period; and controlling, in response to determining that the current of the photovoltaic string is less than the current threshold and the coding information sent by the converter is not received for the first preset time period, an output voltage or an output power of the MLPE device to be less than a corresponding threshold, to reduce voltage stress of the chopper switching device in the converter while maintaining power supply in the converter.

2. The method for controlling operation of the MLPE device according to claim 1, wherein the controlling an output voltage or an output power of the MLPE device to be less than a corresponding threshold comprises:

controlling the switching device to switch with a fixed cycle and a fixed duty cycle, to reduce the output voltage and the output power of the MLPE device.

3. The method for controlling operation of the MLPE device according to claim 1, wherein the controlling an output voltage or an output power of the MLPE device to be less than a corresponding threshold comprises:

controlling the switching device to switch, to cause the output voltage of the MLPE device to be less than a first preset voltage threshold.

4. The method for controlling operation of the MLPE device according to claim 1, wherein before controlling the output voltage or the output power of the MLPE device to be less than the corresponding threshold, the method further comprises:

detecting an input voltage of the MLPE device, and determining whether the input voltage is greater than a second preset voltage threshold; and controlling, if it is determined that the input voltage is greater than the second preset voltage threshold, the output voltage or the output power of the MLPE device to be less than the corresponding threshold.

5. The method for controlling operation of the MLPE device according to claim 1, wherein after controlling the output voltage or the output power of the MLPE device to be less than the corresponding threshold, the method further comprises:

determining whether the coding information is not received for a second preset time period, wherein the second preset time period is greater than the first preset time period; and controlling, if the coding information is not received for the second preset time period, the output voltage of the MLPE device to be less than a third preset voltage threshold.

6. The method for controlling operation of the MLPE device according to claim 5, wherein the controlling the output voltage of the MLPE device to be less than a third preset voltage threshold comprises:

controlling the switching device to be turned off.

7. The method for controlling operation of the MLPE device according to claim 1, wherein the coding information is at least one of a voltage fluctuation and a current fluctuation on an input side of the converter.

* * * * *